United States Patent
Wang et al.

(10) Patent No.: US 10,148,676 B2
(45) Date of Patent: Dec. 4, 2018

(54) METHOD AND DEVICE FOR DEFENDING DHCP ATTACK

(71) Applicant: HANGZHOU DPTECH TECHNOLOGIES CO., LTD., Hangzhou (CN)

(72) Inventors: Xuecong Wang, Hangzhou (CN); Gang Yu, Hangzhou (CN)

(73) Assignee: Hangzhou DPtech Technologies Co., Ltd., Hangzhou (CN)

( * ) Notice: Subject to any disclaimer, the term of this patent is extended or adjusted under 35 U.S.C. 154(b) by 181 days.

(21) Appl. No.: 15/426,973

(22) Filed: Feb. 7, 2017

(65) Prior Publication Data
US 2017/0318040 A1     Nov. 2, 2017

(30) Foreign Application Priority Data
Apr. 28, 2016  (CN) .......................... 2016 1 0281948

(51) Int. Cl.
| G06F 11/00 | (2006.01) |
| H04L 29/06 | (2006.01) |
| H04L 12/26 | (2006.01) |
| H04L 29/12 | (2006.01) |

(52) U.S. Cl.
CPC .......... *H04L 63/1416* (2013.01); *H04L 43/08* (2013.01); *H04L 43/0876* (2013.01); *H04L 61/2015* (2013.01); *H04L 63/0236* (2013.01); *H04L 63/0254* (2013.01); *H04L 63/1441* (2013.01)

(58) Field of Classification Search
USPC .................. 726/22, 23–25; 713/187–189
See application file for complete search history.

(56) References Cited

U.S. PATENT DOCUMENTS

| 7,826,447 B1 | 11/2010 | Bishara et al. |
| 7,917,621 B2 * | 3/2011 | Suzuki ................. H04L 43/00 370/398 |

(Continued)

FOREIGN PATENT DOCUMENTS

| CN | 1741458 A | 3/2006 |
| CN | 1949784 A | 4/2007 |

(Continued)

OTHER PUBLICATIONS

State Intellectual Property Office of the People's Republic of China, Office Action and Search Report Issued in Application No. 201610281948.8, dated Jul. 30, 2018, 17 pages. (Submitted with Partial Translation).

*Primary Examiner* — Amare F Tabor
(74) *Attorney, Agent, or Firm* — McCoy Russell LLP (57) ABSTRACT

A method for defending a DHCP attack is provided. The method includes monitoring packets transmitted by a client terminal coupled to a target port, and determining, in IP addresses allocated for the client terminal coupled to the target port, the number of the IP addresses generating no packet traffic in a preset first time. And the method further includes if the number of the IP addresses generating no packet traffic reaches a preset first threshold, determining that the client terminal coupled to the target port has risk of attacking, and restricting DHCP service of the target port. A device for defending a DHCP attack is also provided.

10 Claims, 5 Drawing Sheets

(56) References Cited

U.S. PATENT DOCUMENTS

| | | | | |
|---|---|---|---|---|
| 8,191,143 | B1* | 5/2012 | Lin | H04L 63/1483 |
| | | | | 713/153 |
| 9,264,402 | B2* | 2/2016 | Anderson | H04L 63/1441 |
| 9,350,754 | B2* | 5/2016 | Lingafelt | H04L 63/1441 |
| 2010/0088399 | A1* | 4/2010 | Gluck | H04L 63/104 |
| | | | | 709/221 |
| 2010/0241861 | A1* | 9/2010 | Yoshimoto | H04L 61/2015 |
| | | | | 713/170 |
| 2010/0313265 | A1* | 12/2010 | Lin | H04L 29/12915 |
| | | | | 726/22 |
| 2016/0315909 | A1* | 10/2016 | von Gravrock | H04L 12/283 |

FOREIGN PATENT DOCUMENTS

| | | |
|---|---|---|
| CN | 101262503 A | 9/2008 |
| CN | 101453447 A | 6/2009 |
| CN | 101483515 A | 7/2009 |
| CN | 101605061 A | 12/2009 |
| CN | 101730090 A | 6/2010 |
| CN | 101795300 A | 8/2010 |
| CN | 102185724 A | 9/2011 |
| CN | 102801716 A | 11/2012 |
| CN | 103179223 A | 6/2013 |

* cited by examiner

METHOD AND DEVICE FOR DEFENDING DHCP ATTACK

CROSS-REFERENCE TO RELATED APPLICATIONS

The present application claims priority to Chinese Patent Application No. 201610281948.8, filed on Apr. 28, 2016, the entire contents of which are hereby incorporated by reference for all purposes.

TECHNICAL FIELD

The present application relates to the technical field of network communications, in particular to a method and device for defending a DHCP attack.

BACKGROUND

With the increasing complication of the network, most client terminals access the network by dynamically allocating IP addresses via a DHCP (dynamic host configuration protocol). The DHCP includes a DHCP server and a client terminal. When the DHCP server and the client terminal are not in the same network segment, a DHCP relay device (such as a switch or a router) may be deployed to relay a DHCP request of the client terminal, transmit the DHCP request of the client terminal to the DHCP server, and transmit the reply of the DHCP server to the client terminal. The use of the DHCP relay device may manage IP addresses more centrally and effectively.

However, the DHCP adopts a simple trust mode, namely any client terminal transmitting an IP address application request is defaulted to be secure, with the result that the DHCP server is highly subject to attacks. For example, an attacker controls a client terminal to spoof a large number of MAC addresses and transmit a large number of IP address application request packets, with the result that the IP addresses in the address pool of the DHCP server are quickly exhausted. When a normal client terminal requests for allocating an IP address, the DHCP server would have no allocable IP address, so the IP address application request of the normal client terminal would be denied, thus the normal client terminal cannot acquire an IP address and cannot access the network.

SUMMARY

In accordance with one aspect of the present disclosure, a method for defending a DHCP (dynamic host configuration protocol) attack is provided. The method includes monitoring packets transmitted by a client terminal coupled to a target port, and determining, in IP addresses allocated for the client terminal coupled to the target port, the number of the IP addresses generating no packet traffic in a preset first time. And the method further includes if the number of the IP addresses generating no packet traffic reaches a preset first threshold, determining that the client terminal coupled to the target port has risk of attacking, and restricting DHCP service of the target port.

In accordance with another aspect of the present disclosure, a device for defending a DHCP attack is provided. The device includes a monitoring unit and a first processing unit. The monitoring unit is for monitoring packets transmitted by a client terminal coupled to a target port, and determining, in IP addresses allocated for the client terminal coupled to the target port, the number of the IP addresses generating no packet traffic in a preset first time. The first processing unit is for determining that the client terminal coupled to the target port has risk of attacking and restricting DHCP service of the target port when the number of the IP addresses generating no packet traffic reaches a preset first threshold.

DETAILED DESCRIPTION

The exemplary embodiments will be described in details hereafter, and the examples thereof are as shown in the drawings. When the descriptions hereafter refer to the drawings, unless otherwise stated, the same number in different drawings denotes the same or similar elements. The implementation modes described in the following exemplary embodiments do not represent all the implementation modes consistent with the present application. On the contrary, those implementation modes are only examples of the device and the method consistent with one or more aspects of the present application as described in claims.

The terminologies used in the present application are only intended to describe specific embodiments, but not to restrict the present application. The singular forms "a", "an" and "the" used in the present application and claims are intended to also comprise plurality forms, unless other meanings are clearly indicated in the context. As should be further appreciated, the terminology "and/or" used in the text is intended to comprise any one or all possible combinations of one or more associated listed items.

As should be appreciated, although the present application may use the terminologies "first", "second", "third" and the like to describe various information, the terminologies are only used to distinguish the same type of information from each other, but not to restrict the information. For example, under the premise without deviating from the scope of the present application, first information can also be called as second information; similarly, second information can also be called as first information. Depending on the context, the word "if" used in the text can be explained as "when" or "while" or "in response to determining".

If a client terminal wants to access a network and communicate with other client terminals, the client terminal must have an IP address. Since the IP address resource is limited, the client terminal having a network connection requirement will be allocated with a temporary address in a DHCP manner. Specifically, when a client terminal accesses the network, the client terminal transmits an IP address application request to a DHCP server, and the DHCP server temporarily allocates an IP address in the address pool to the client terminal; and after the client terminal gets off the line, the DHCP server may reallocate the IP address to another online client terminal, thus effectively saving IP addresses and improving the utilization ratio of the IP address resource.

With the increasing complication of the network architecture, the client terminal and the DHCP server are probably not in the same network segment. In order to manage IP addresses more centrally and effectively, the form of deploying a DHCP server in each network segment is generally not adopted, instead a DHCP relay device is deployed to relay the IP address application request of a client terminal and the IP address allocated by the DHCP server. Generally speaking, a device having a data flow forwarding function, such as a switch, serves as the DHCP relay device. Specifically, the switch may be configured to have the DHCP relay service function. The specific configuration process will not be elaborated in the present application.

However, the DHCP adopts a simple trust mode; when the DHCP server receives the IP address application request transmitted by the client terminal, the DHCP server allocates the IP address for the client terminal without authenticating whether the client terminal is secure. Therefore, an malicious attacker can control one or more client terminals to spoof a large number of MAC addresses to request for a large number of IP addresses, with the result that the IP addresses in the address pool of the DHCP server are quickly exhausted, and the DHCP server has no allocable IP addresses to allocate for a normal client terminal, so the normal client terminal cannot acquire the IP address and cannot access the network. In order to effectively avoid the occurrence of such situation, the present application provides a method and device for defending a DHCP attack, which will be described in details hereafter.

Figure 1:
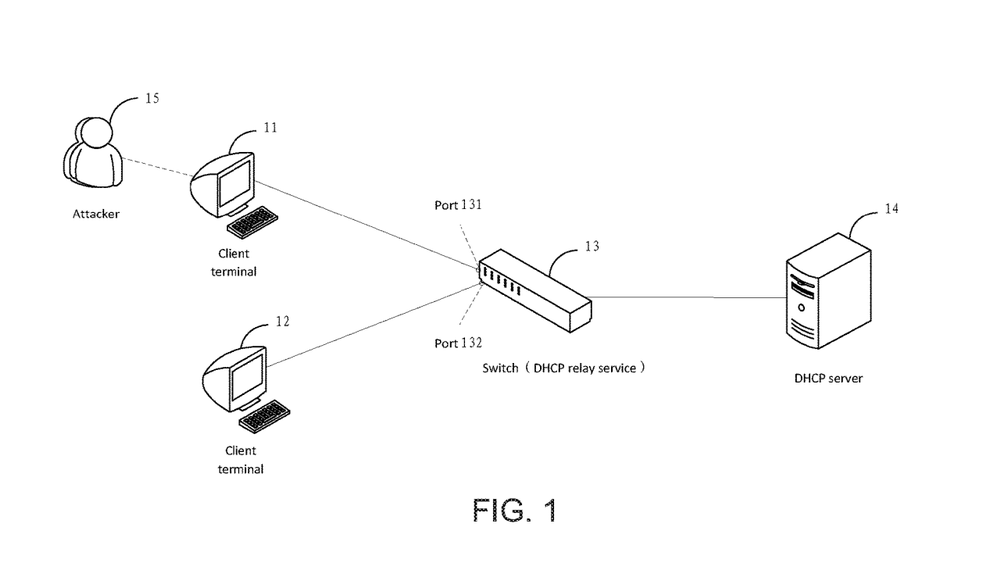
FIG. 1 is a schematic diagram of an application scenario realizing a method for defending a DHCP attack according to one embodiment.

FIG. 1 is a schematic diagram of an application scenario realizing the method for defending a DHCP attack. As shown in FIG. 1, the application scenario includes a client terminal 11, a client terminal 12, a switch 13 and a DHCP server 14. It is assumed that the client terminal 11 is an insecure client terminal controlled by an attacker 15, and the client terminal 12 is a normal client terminal. The switch 13 has been pre-configured to have the DHCP relay service function, so the switch 13 also serves as the DHCP relay device. The client terminal 11 is coupled to the port 131 of the switch 13, and the client terminal 12 is coupled to the port 132 of the switch 13. It is further assumed that the port 131 and the port 132 have activated the DHCP service function. The DHCP server 14 is not in the same network segment with the client terminal 11 and the client terminal 12.

Both the client terminal 11 and the client terminal 12 can transmit an IP address application request to the DHCP server 14. The IP address application request is forwarded to the switch 13 via the ports 131 and 132 of the switch 13 coupled to the client terminals 11 and 12, and is then transmitted to the DHCP server 14 via the switch 13. The DHCP server 14 returns the IP address according to the IP address application request. The IP address may be transmitted to the switch 13, and then forwarded to the client terminals 11 and 12 by the switch 13. After the switch 13 monitors that the IP addresses are allocated for the client terminals 11 and 12 coupled to the ports 131 and 132 thereof, the switch 13 may execute the method for defending the DHCP attack, identify the insecure client terminal 11, and take corresponding measures, thus effectively avoiding the problem that the normal client terminal 12 cannot acquire an IP address and cannot access the network because the IP addresses in the address pool of the DHCP server are maliciously exhausted by the insecure client terminal 11. As can be appreciated, FIG. 1 is described by taking only two client terminals as an example, but in practical application, multiple insecure client terminals and multiple normal client terminals may exist, and one port of the switch 13 may be coupled to one or more client terminals, which is not restricted by the present application.

Figure 2:
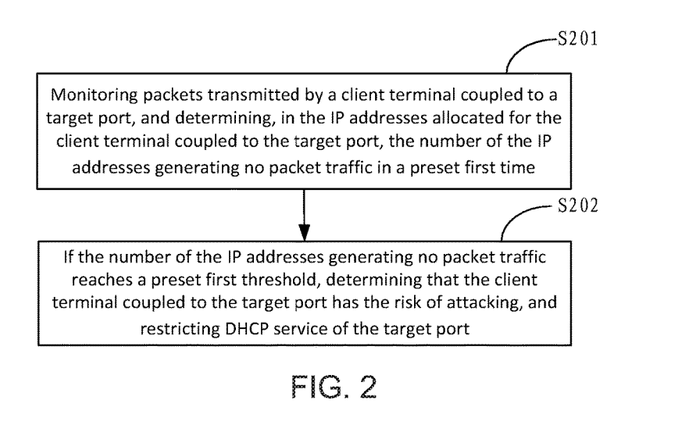
FIG. 2 is a flowchart of the method for defending the DHCP attack according to one embodiment.

FIG. 2 is a flowchart of the method for defending the DHCP attack according to one embodiment. On the basis of the application scenario schematic diagram as shown in FIG. 1, the method in the illustrated embodiment executed by the switch 13 is taken as an example for description. The method for defending the DHCP attack including the following steps:

Step S201, monitoring packets transmitted by the client terminal coupled to a target port, and determining, in the IP addresses allocated for the client terminal coupled to the target port, the number of the IP addresses generating no packet traffic in a preset first time.

After acquiring IP addresses, the client terminal 11 and the client terminal 12 can communicate with other devices on the internet. Generally speaking, the normal client terminal, e.g. the client terminal 12, acquires an IP address for accessing the network and realizing communication. Therefore, the normal client terminal will use the acquired IP address to transmit the packet, e.g. an IP packet or an ARP (address resolution protocol) packet. The packet may be transmitted to the switch 13 via the port 132 of the switch 13, and then forwarded to other devices on the internet by the switch 13. However, the insecure client terminal, e.g. the client terminal 11 controlled by the attacker 15, acquires IP addresses for occupying the IP address resource such that the normal client terminals cannot acquire IP addresses, and the insecure client terminals would probably not use the acquired IP addresses to transmit the packet.

On the basis of the situation, in the embodiment, it is assumed that the port 131 is the target port. The switch 13 may monitor the packets passing through the port 131 to monitor whether the IP addresses allocated for the client terminal coupled to the target port generate packet traffic, and may also determine the number of the IP addresses generating no packet traffic in the preset first time (e.g. five minutes) according to the monitored packets.

Step S202, if the number of the IP addresses generating no packet traffic reaches a preset first threshold, determining that the client terminal coupled to the target port has the risk of attacking, and restricting DHCP service of the target port.

In the embodiment, the first threshold, e.g. 10, can be preset. After the step S201 is executed, and the number of the IP addresses generating no packet traffic all the time in the IP addresses allocated for the client terminal 11 is determined, e.g. 15. By comparison, the number has exceeded the first threshold, so the client terminal coupled to the target port (e.g. the port 131) is determined to have the risk of attacking, and the DHCP service of the port 131 is restricted to prevent the client terminal 11 from continuing to acquire IP addresses via the port 131 and wasting the IP addresses in the address pool of the DHCP server 14.

As can be seen from the method in the embodiment above, the method monitors the packets transmitted by the client terminal coupled to the target port, acquires, in the IP addresses allocated for the client terminal coupled to the target port, the number of the IP addresses generating no packet traffic in the preset first time, determines whether the client terminal coupled to the target port has the risk of attacking according to the number, and restricts the DHCP service of the target port when the client terminal is determined to have the risk of attacking, thus effectively avoiding the problem that the normal client terminal cannot acquire the IP address and cannot access the network because the client terminal having the risk of attacking wastes maliciously the IP address resource and the IP addresses in the address pool of the DHCP server are maliciously exhausted.

Figure 3:
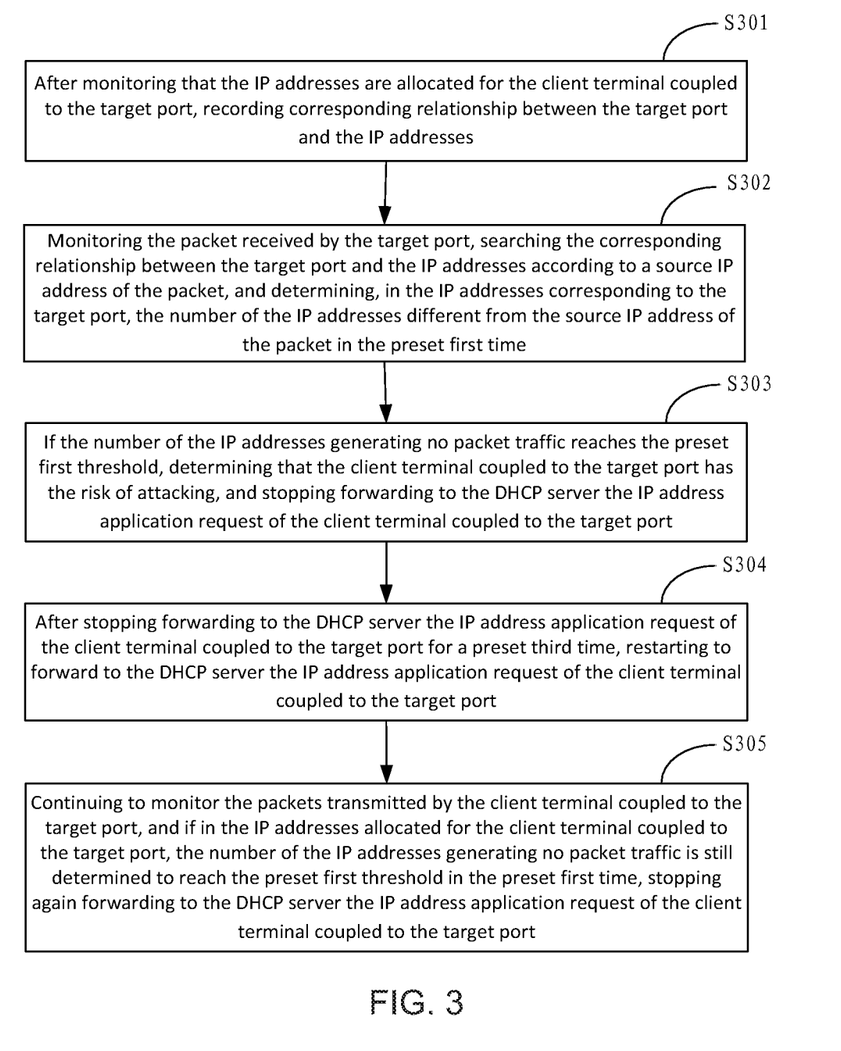
FIG. 3 is a flowchart of the method for defending the DHCP attack according to another embodiment.

FIG. 3 is a flowchart of the method for defending the DHCP attack according to another embodiment. On the basis of the application scenario as shown in FIG. 1 and the flowchart as shown in FIG. 2, the method of the embodiment in FIG. 3 executed by the switch 13 is still taken as an example for description. The method for defending the DHCP attack includes the following steps:

Step S301, after monitoring that the IP addresses are allocated for the client terminal coupled to the target port, recording corresponding relationship between the target port and the IP addresses.

In the embodiment, as can be seen from the descriptions above, the switch 13 may serve as the DHCP relay device to forward to the DHCP server the IP address application request transmitted by the client terminal (e.g. the client terminal 11) coupled to the target port (e.g. the port 131), and forward the IP address allocated for the client terminal by the DHCP server to the client terminal via the target port. Therefore, the switch 13 may record the corresponding relationship between the target port and the IP addresses allocated for the client terminal coupled to the target port after monitoring that the IP addresses are allocated for the client terminal coupled to the target port. Table 1 as follows depicts the corresponding relationship between the target port and the IP addresses allocated for the client terminal coupled to the target port.

TABLE 1

| Target port | IP address |
| --- | --- |
| Port 131 | 192.168.1.21 |
|  | 192.168.1.22 |
|  | 192.168.1.23 |
|  | ... |

As shown in table 1, the corresponding relationship may be a one-to-many relationship. For example, a plurality of client terminals are coupled to the switch 13 via the port 131, then the switch 13 may record the plurality of IP addresses corresponding to the port 131; for another example, the attacker controls the client terminal 11, spoofs a plurality of MAC addresses on the client terminal 11, and respectively requests for allocating an IP address for each MAC address, then the switch 13 may also record the plurality of IP addresses corresponding to the port 131.

Step S302, monitoring the packet received by the target port, searching the corresponding relationship between the target port and the IP addresses according to a source IP address of the packet, and determining, in the IP addresses corresponding to the target port, the number of the IP addresses different from the source IP address of the packet in the preset first time.

In the present step, how the switch 13 monitors the packet received by the target port may refer to the relevant descriptions in step S201, and the redundant description thereof will be omitted herein.

In the embodiment, when the switch 13 monitors that the target port, e.g. the port 131, receives the packet in the preset first time, e.g. five minutes, the switch 13 may search the corresponding relationship in table 1 according to the source IP of the packet, and determine the number of the IP addresses existing in table 1 but not detected in the packet received by the target port, namely determine the number of the IP addresses generating no packet traffic all the time in the first time in the IP addresses allocated for the client terminal coupled to the target port.

Step S303, if the number of the IP addresses generating no packet traffic reaches the preset first threshold, determining that the client terminal coupled to the target port has the risk of attacking, and stopping forwarding to the DHCP server the IP address application request of the client terminal coupled to the target port.

In the present step, how to determine that the client terminal coupled to the target port has the risk of attacking may refer to the relevant descriptions in step S202, and the redundant description thereof will be omitted herein.

In an embodiment, when the client terminal coupled to the target port is determined to have the risk of attacking, in order to avoid the DHCP server from being further attacked and avoid the IP addresses in the address pool of the DHCP server from being further maliciously requested and allocated, the configuration may be changed to stop the DHCP service of the target port. For example, when the switch receives the IP address application request from the target port, the switch does not forward the received IP address application request to the DHCP server any more.

In addition, in an embodiment, when the client terminal coupled to the target port is determined to have the risk of attacking, the switch 13 may also transmit an IP address release request to the DHCP server. The IP address release request is for requesting the DHCP server to release the IP addresses allocated for the client terminal coupled to the target port, for example, requesting the DHCP server to release the IP addresses in table 1 corresponding to the port 131, such that the IP addresses in the address pool of the DHCP server may be recovered, thus effectively avoiding the IP address resource in the address pool from be maliciously exhausted.

Step S304, after stopping forwarding to the DHCP server the IP address application request of the client terminal coupled to the target port for a preset third time, restarting to forward to the DHCP server the IP address application request of the client terminal coupled to the target port.

In order to effectively avoid influencing the network connection of the normal client terminal, for example, other client terminals coupled to the port 131 but not controlled by the attacker 15 are normal client terminals, after the step S303 is executed and the DHCP service of the port 131 is stopped, such other client terminals cannot acquire IP addresses either and cannot access the network. In an embodiment, the third time may be preset (e.g. ten minutes), and after the DHCP service of the target port is stopped for the third time, the DHCP service of the port 131 may be restarted, thus when the switch 13 receives an IP address application request via the port 131, the switch 13 will continue to forward the IP address application request to the DHCP server.

Step S305, continuing to monitor the packets transmitted by the client terminal coupled to the target port, and if in the IP addresses allocated for the client terminal coupled to the target port, the number of the IP addresses generating no packet traffic is still determined to reach the preset first threshold in the preset first time, stopping again forwarding to the DHCP server the IP address application request of the client terminal coupled to the target port.

In an embodiment, after the DHCP service of the target port is restarted by executing step S304, step S302 and step S303 may be re-executed to monitor the packets transmitted by the client terminal coupled to the target port and determine whether the client terminal still has the risk of attacking. If the client terminal is still determined to have the risk of attacking, the DHCP service of the target port may be stopped again, for example, stopping again forwarding to the DHCP server the IP address application request of the client terminal connected to the target port.

As can be appreciated, in practical application, after the step S305, the switch 13 may execute step S304 once again, and then execute step S305, which repeats again and again. In the illustrated embodiment, the steps S304 and S305 are executed only once, and are intended to describe how the method defends the DHCP attack. The specific execution times of the steps S304 and S305 are not restricted.

As can be seen from the method in the embodiment above, the method may monitor the packets transmitted by the client terminal coupled to the target port, acquire, in the IP addresses allocated for the client terminal coupled to the target port, the number of the IP addresses generating no packet traffic in a preset first time, determine whether the client terminal coupled to the target port has the risk of attacking according to the number, and stop forwarding to the DHCP server the IP address application request of the client terminal coupled to the target port when the client terminal is determined to have the risk of attacking, thus effectively avoiding the problem that the normal client terminal cannot acquire the IP address and cannot access the network because the client terminal having the risk of attacking wastes maliciously the IP address resource and the IP addresses in the address pool of the DHCP server are maliciously exhausted.

Figure 4:
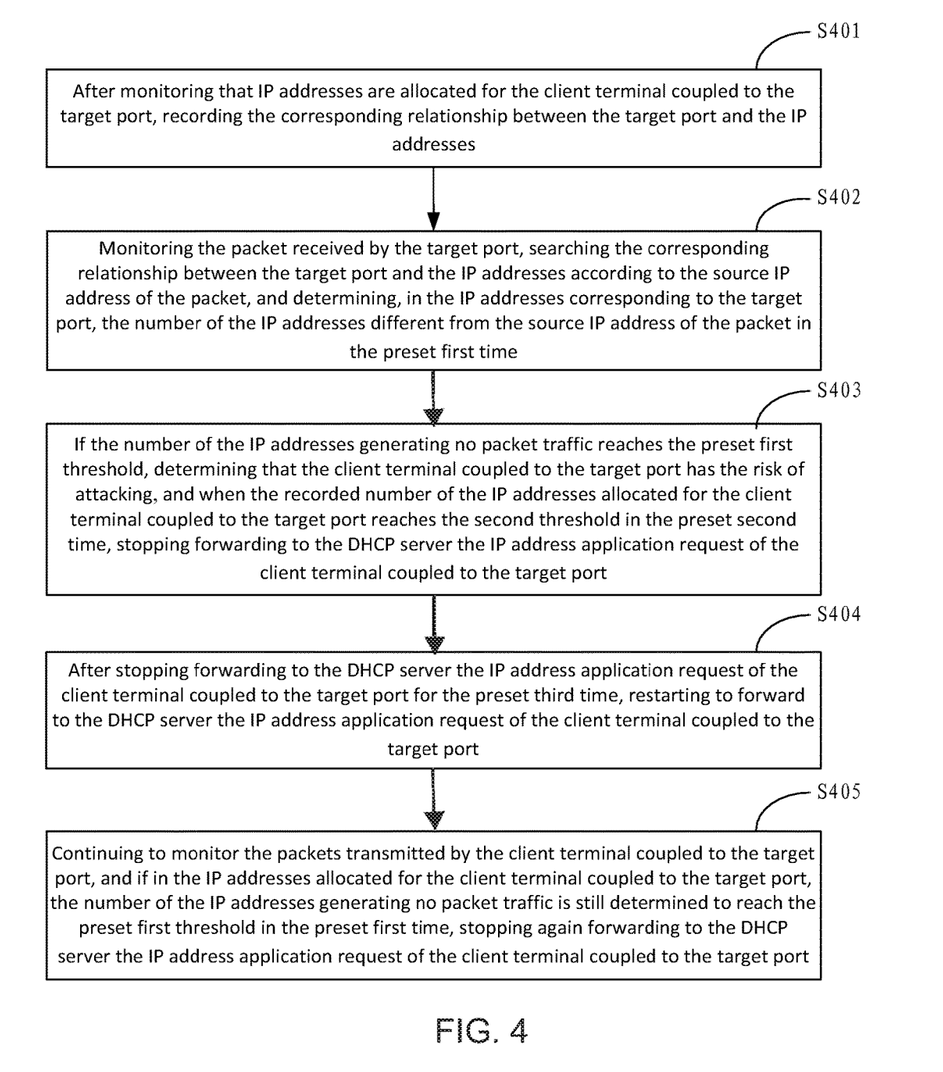
FIG. 4 is a flowchart of the method for defending the DHCP attack according to another embodiment.

FIG. 4 is a flowchart of the method for defending the DHCP attack according to another embodiment. On the basis of the application scenario as shown in FIG. 1 and the flowchart as shown in FIG. 2, the method the embodiment in FIG. 4 executed by the switch 13 is still taken as an example for description. The method for defending the DHCP attack includes the following steps:

Step S401, after monitoring that IP addresses are allocated for the client terminal coupled to the target port, recording the corresponding relationship between the target port and the IP addresses.

The descriptions of the present step may refer to the relevant descriptions in step S301, and the redundant description thereof will be omitted herein.

Step S402, monitoring the packet received by the target port, searching the corresponding relationship between the target port and the IP addresses according to the source IP address of the packet, and determining, in the IP addresses corresponding to the target port, the number of the IP addresses different from the source IP address of the packet in the preset first time.

The descriptions of the present step may refer to the relevant descriptions in step S302, and the redundant description thereof will be omitted herein.

Step S403, if the number of the IP addresses generating no packet traffic reaches the preset first threshold, determining that the client terminal coupled to the target port has the risk of attacking, and when the recorded number of the IP addresses allocated for the client terminal coupled to the target port reaches the second threshold in the preset second time, stopping forwarding to the DHCP server the IP address application request of the client terminal coupled to the target port.

In the present step, how to determine that the client terminal coupled to the target port has the risk of attacking may refer to the relevant descriptions in step S202, and the redundant description thereof will be omitted herein.

In the embodiment, when the client terminal coupled to the target port is determined to have the risk of attacking, the number of the IP addresses allocated for the client terminal coupled to the target port may be restricted. Specifically, as described in step S301, the switch 13 may record the corresponding relationship between the target port and the IP addresses allocated for the client terminal coupled to the target port, and may also record the number of the IP addresses allocated for the client terminal coupled to the target port.

When the number of the IP addresses allocated for the client terminal coupled to the target port, which is recorded by the switch 13, reaches the second threshold, e.g. ten, in the preset second time, e.g. two minutes, the switch 13 does not forward the DHCP packet received via the target port to the DHCP server, such that the IP addresses in the address pool of the DHCP server will not be quickly exhausted.

Step S404, after stopping forwarding to the DHCP server the IP address application request of the client terminal coupled to the target port for the preset third time, restarting to forward to the DHCP server the IP address application request of the client terminal coupled to the target port.

Step S405, continuing to monitor the packets transmitted by the client terminal coupled to the target port, and if in the IP addresses allocated for the client terminal coupled to the target port, the number of the IP addresses generating no packet traffic is still determined to reach the preset first threshold in the preset first time, stopping again forwarding to the DHCP server the IP address application request of the client terminal coupled to the target port.

The detailed descriptions of step S404 and step S405 may refer to the relevant descriptions in step S304 and step S305, and the redundant description thereof will be omitted herein.

As can be seen from the method in the embodiment above, the method may monitor the packets transmitted by the client terminal coupled to the target port, acquire in the IP addresses allocated for the client terminal coupled to the target port, the number of the IP addresses generating no packet traffic in the preset first time, determine whether the client terminal coupled to the target port has the risk of attacking according to the number, and restrict the number of the IP addresses allocated for the client terminal coupled to the target port when the client terminal is determined to have the risk of attacking, thus effectively avoiding the problem that the normal client terminal cannot acquire an IP address and cannot access the network because the IP addresses in the address pool of the DHCP server are quickly exhausted.

Corresponding to the method for defending the DHCP attack as described above, a device for defending the DHCP attack is provided.

Figure 5:
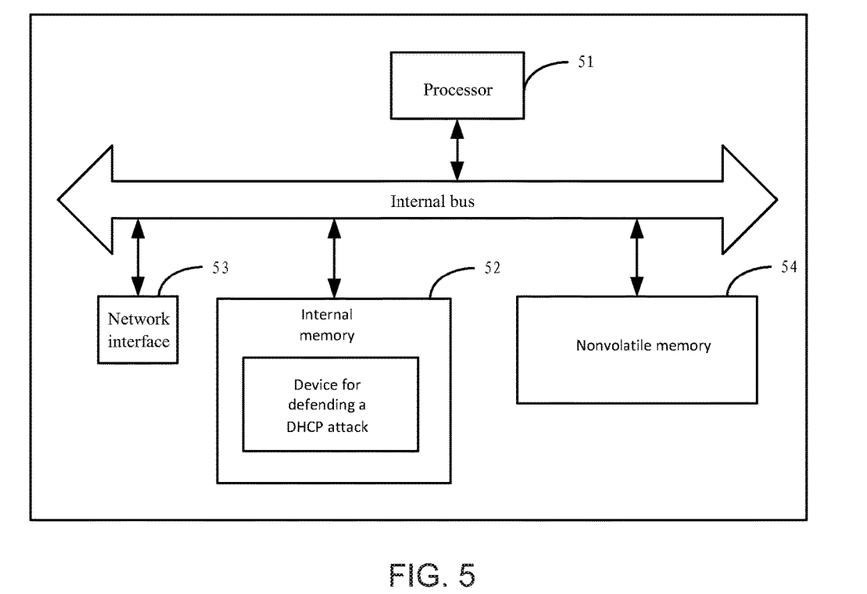
FIG. 5 is a hardware structure diagram of an apparatus in which a device for defending the DHCP attack is located according to an embodiment.

The device for defending the DHCP attack may be applied to the DHCP relay device, e.g. the switch. The device may be implemented by means of software, or hardware or the combination thereof. By taking the software implementation as an example, as a logical device, the software is formed by reading, via the processor of an apparatus in which the software is installed, a corresponding computer program instruction in a nonvolatile memory to an internal memory for running. With respect to the hardware layer, FIG. 5 is a hardware structure diagram of an apparatus in which the device for defending the DHCP attack is located according to an embodiment. As shown in FIG. 5, besides a processor 51, an internal memory 52, a network interface 53 and a nonvolatile memory 54 in FIG. 5, the apparatus in which the device in the embodiment is located generally further includes other hardware according to the practical functions of the apparatus, and the redundant description thereof will be omitted herein.

Figure 6:
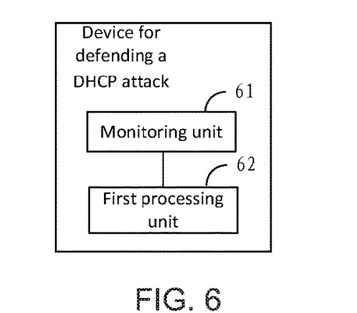
FIG. 6 is a block diagram of the device for defending the DHCP attack according to one embodiment.

Please refer to FIG. 6 which is a block diagram of the device for defending the DHCP attack according to one embodiment. The device as shown in FIG. 6 is applied to the DHCP relay device, and includes a monitoring unit 61 and a first processing unit 62.

The monitoring unit 61 is for monitoring the packets transmitted by a client terminal coupled to a target port, and determining, in the IP addresses allocated for the client terminal coupled to the target port, the number of the IP addresses generating no packet traffic in a preset first time; and The first processing unit 62 is for determining that the client terminal coupled to the target port has the risk of attacking and restricting the DHCP service of the target port when the number of the IP addresses generating no packet traffic reaches a preset first threshold.

Figure 7:
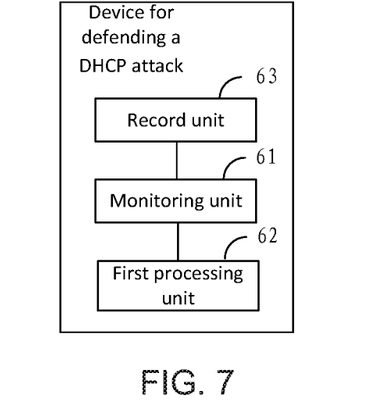
FIG. 7 is a block diagram of the device for defending the DHCP attack according to another embodiment.

Please refer to FIG. 7 which is a block diagram of the device for defending the DHCP attack according to another embodiment. On the basis of the device as shown in FIG. 6, the device as shown in FIG. 7 further includes a record unit 63.

The record unit 63 is for recording the corresponding relationship between the target port and the IP addresses after monitoring that IP addresses are allocated for the client terminal coupled to the target port.

In one embodiment, the monitoring unit 61 is for monitoring the packet received by the target port, searching the corresponding relationship between the target port and the IP addresses according to the source IP address of the packet, and determining, in the IP addresses corresponding to the target port, the number of the IP addresses different from the source IP address of the packet in the preset first time.

In another embodiment, the first processing unit 62 is for determining that the client terminal coupled to the target port has the risk of attacking and stopping forwarding to the DHCP server the IP address application request of the client terminal coupled to the target port when the number of the IP addresses generating no packet traffic reaches the preset first threshold.

In another embodiment, the first processing unit 62 is for determining that the client terminal coupled to the target port has the risk of attacking and transmitting an IP address release request to the DHCP server when the number of the IP addresses generating no packet traffic reaches the preset first threshold. The IP address release request is for requesting the DHCP server to release the IP addresses allocated for the client terminal coupled to the target port.

In another embodiment, the first processing unit 62 is for determining that the client terminal coupled to the target port has the risk of attacking when the number of the IP addresses generating no packet traffic reaches the preset first threshold, and stopping forwarding to the DHCP server the IP address application request of the client terminal coupled to the target port when the recorded number of the IP addresses allocated for the client terminal coupled to the target port reaches a second threshold in a preset second time.

Figure 8:
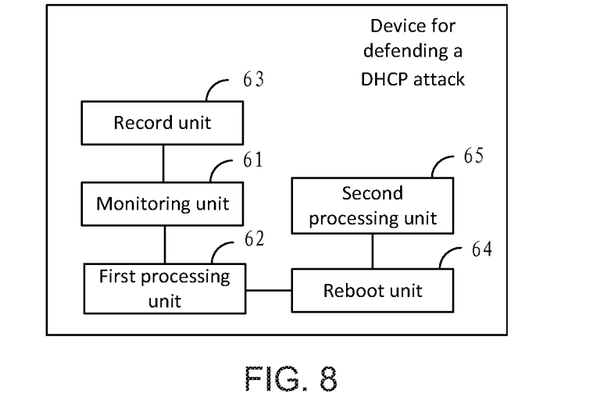
FIG. 8 is a block diagram of the device for defending the DHCP attack according to another embodiment.

Please refer to FIG. 8 which is a block diagram of the device for defending the DHCP attack according to another embodiment. On the basis of the device as shown in FIG. 7, the device as shown in FIG. 8 further includes a reboot unit 64 and a second processing unit 65.

The reboot unit 64 is for restarting to forward to the DHCP server the IP address application request of the client terminal coupled to the target port after stopping forwarding to the DHCP server the IP address application request of the client terminal coupled to the target port for a preset third time.

The second processing unit 65 is for continuing to monitor the packets transmitted by the client terminal coupled to the target port, and stopping again forwarding to the DHCP server the IP address application request of the client terminal coupled to the target port if the number of the IP addresses, in the IP addresses allocated for the client terminal coupled to the target port, generating no packet traffic is still determined to reach the preset first threshold in the preset first time.

The specific implementation processes of the functions and actions of the units in the device can refer to the implementation processes of corresponding steps in the method, and the redundant description thereof will be omitted herein.

With respect to the device embodiments, since the device embodiments basically corresponds to the method embodiments, the associated descriptions can refer to the corresponding descriptions of the method embodiments. The device embodiments described above are given by way of illustration only, wherein the units described as separated components can be or not be physically separated, and the component described as a unit can be or not be a physical unit, namely can be located at one place, or distributed on a plurality of network units. A part of the whole modules in the embodiments can be selected according to practical requirement to achieve the objects of the solution of the present application, which can be appreciated and implemented by an ordinary person skilled in the art without involving an inventive effort.

The descriptions above are only preferable embodiments of the present application, and are not used to restrict the present application. Any amendments, equivalent substitutions, improvements and the like within the spirit and principle of the present application are all concluded in the protection scope of the present application.

The above are only preferred examples of the present disclosure is not intended to limit the disclosure within the spirit and principles of the present disclosure, any changes made, equivalent replacement, or improvement in the protection of the present disclosure should contain within the range.

The methods, processes and units described herein may be implemented by hardware (including hardware logic circuitry), software or firmware or a combination thereof. The term 'processor' is to be interpreted broadly to include a processing unit, ASIC, logic unit, or programmable gate array etc. The processes, methods and functional units may all be performed by the one or more processors; reference in this disclosure or the claims to a 'processor' should thus be interpreted to mean 'one or more processors'.

Further, the processes, methods and functional units described in this disclosure may be implemented in the form of a computer software product. The computer software product is stored in a storage medium and comprises a plurality of instructions for making a processor to implement the methods recited in the examples of the present disclosure.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Throughout the present disclosure, the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for defending a DHCP (dynamic host configuration protocol) attack, comprising:
   monitoring packets transmitted by a client terminal coupled to a target port, and determining, in IP addresses allocated for the client terminal coupled to the target port, the number of the IP addresses generating no packet traffic in a preset first time; and
   if the number of the IP addresses generating no packet traffic reaches a preset first threshold, determining that the client terminal coupled to the target port has risk of attacking, and restricting DHCP service of the target port,
   wherein the restricting the DHCP service of the target port, comprises:
      when the recorded number of the IP addresses allocated for the client terminal coupled to the target port reaches a second threshold in a preset second time, stopping forwarding to the DHCP server the IP address application request of the client terminal coupled to the target port;
   further comprising:
      after stopping forwarding to the DHCP server the IP address application request of the client terminal coupled to the target port for a preset third time, restarting to forward to the DHCP server the IP address application request of the client terminal coupled to the target port; and
      continuing to monitor the packets transmitted by the client terminal coupled to the target port, and if in the IP addresses allocated for the client terminal coupled to the target port, the number of the IP addresses generating no packet traffic is still determined to reach the preset first threshold in the preset first time, stopping again forwarding to the DHCP server the IP address application request of the client terminal coupled to the target port.

2. The method according to claim 1, further comprising: after monitoring that the IP addresses are allocated for the client terminal coupled to the target port, recording the corresponding relationship between the target port and the IP addresses; and wherein the monitoring the packets transmitted by a client terminal coupled to a target port, and determining, in the IP addresses allocated for the client terminal coupled to the target port, the number of the IP addresses generating no packet traffic in a preset first time, comprises: monitoring the packet received by the target port, searching the corresponding relationship between the target port and the IP addresses according to a source IP address of the packet, and determining, in the IP addresses corresponding to the target port, the number of the IP addresses different from the source IP address of the packet in the preset first time.

3. The method according to claim 1, wherein the restricting the DHCP service of the target port, comprises: stopping forwarding to the DHCP server an IP address application request of the client terminal coupled to the target port.

4. The method according to claim 3, further comprising: after stopping forwarding to the DHCP server the IP address application request of the client terminal coupled to the target port for a preset third time, restarting to forward to the DHCP server the IP address application request of the client terminal coupled to the target port; and continuing to monitor the packets transmitted by the client terminal coupled to the target port, and if in the IP addresses allocated for the client terminal coupled to the target port, the number of the IP addresses generating no packet traffic is still determined to reach the preset first threshold in the preset first time, stopping again forwarding to the DHCP server the IP address application request of the client terminal coupled to the target port.

5. The method according to claim 1, wherein the restricting the DHCP service of the target port, comprises: transmitting an IP address release request to the DHCP server, the IP address release request is for requesting the DHCP server to release the IP addresses allocated for the client terminal coupled to the target port.

6. A device for defending a DHCP attack, comprising:
   a monitoring unit for monitoring packets transmitted by a client terminal coupled to a target port, and determining, in IP addresses allocated for the client terminal coupled to the target port, the number of the IP addresses generating no packet traffic in a preset first time; and
   a first processing unit for determining that the client terminal coupled to the target port has risk of attacking and restricting DHCP service of the target port when the number of the IP addresses generating no packet traffic reaches a preset first threshold,
   wherein the first processing unit is for determining that the client terminal coupled to the target port has the risk of attacking when the number of the IP addresses generating no packet traffic reaches a preset first threshold, and stopping forwarding to the DHCP server the IP address application request of the client terminal coupled to the target port when the recorded number of the IP addresses allocated for the client terminal coupled to the target port reaches a second threshold in a preset second time;

further comprising:
- a reboot unit for restarting to forward to the DHCP server the IP address application request of the client terminal coupled to the target port after stopping forwarding to the DHCP server the IP address application request of the client terminal coupled to the target port for a preset third time; and
- a second processing unit for continuing to monitor the packets transmitted by the client terminal coupled to the target port, and if in the IP addresses allocated for the client terminal coupled to the target port, the number of the IP addresses generating no packet traffic is still determined to reach the preset first threshold in the preset first time, stopping again forwarding to the DHCP server the IP address application request of the client terminal coupled to the target port.

7. The device according to claim 6, further comprising: a record unit for recording the corresponding relationship between the target port and the IP addresses after monitoring that the IP addresses are allocated for the client terminal coupled to the target port; and wherein the monitoring unit for monitoring the packet received by the target port, searching the corresponding relationship between the target port and the IP addresses according to a source IP address of the packet, and determining, in the IP addresses corresponding to the target port, the number of the IP addresses different from the source IP address of the packet in the preset first time.

8. The device according to claim 6, wherein the first processing unit is for determining that the client terminal coupled to the target port has the risk of attacking, and stopping forwarding to the DHCP server the IP address application request of the client terminal coupled to the target port when the number of the IP addresses generating no packet traffic reaches a preset first threshold.

9. The device according to claim 8, wherein further comprising: a reboot unit for restarting to forward to the DHCP server the IP address application request of the client terminal coupled to the target port after stopping forwarding to the DHCP server the IP address application request of the client terminal coupled to the target port for a preset third time; and a second processing unit for continuing to monitor the packets transmitted by the client terminal coupled to the target port, and if in the IP addresses allocated for the client terminal coupled to the target port, the number of the IP addresses generating no packet traffic is still determined to reach the preset first threshold in the preset first time, stopping again forwarding to the DHCP server the IP address application request of the client terminal coupled to the target port.

10. The device according to claim 6, wherein the first processing unit is for determining that the client terminal coupled to the target port has the risk of attacking and transmitting an IP address release request to the DHCP server when the number of the IP addresses generating no packet traffic reaches a preset first threshold, and wherein the IP address release request is for requesting the DHCP server to release the IP addresses allocated for the client terminal coupled to the target port.

* * * * *